US006621880B1

(12) United States Patent
Niesen

(10) Patent No.: US 6,621,880 B1
(45) Date of Patent: Sep. 16, 2003

(54) DIGITAL IF RECEIVER

(75) Inventor: Joseph W. Niesen, La Mirada, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/316,608

(22) Filed: May 21, 1999

(51) Int. Cl.[7] ............................. H04L 27/06; H04L 7/00
(52) U.S. Cl. ..................... 375/340; 375/341; 375/355
(58) Field of Search ....................... 375/261, 262, 375/279, 326, 355, 280, 284, 316, 329, 331, 332, 341, 340; 714/794, 795; 329/100, 304

(56) References Cited

U.S. PATENT DOCUMENTS

| | | | | |
|---|---|---|---|---|
| 4,864,244 A | * | 9/1989 | Sasaki | 329/304 |
| 5,896,419 A | * | 4/1999 | Suzuki | 375/219 |
| 5,923,651 A | * | 7/1999 | Struhsaker | 370/342 |

OTHER PUBLICATIONS

Gitlin, Hayes and Weinstein, *Data Communication Principles*, pp. 488–513.
Haykin, *Communication Systems*, pp. 114–116, 123–125, 202–213, 216–219, 318, 320, 371–375, 530–531.
Lin and Vaidyanathan, *Periodically Nonuniform Sampling of Bandpass Signals*, IEEE Transactions on Circuits and Systems—II: Analog and Digital Signal Processing, vol. 45, No. 3, Mar. 1998.

* cited by examiner

*Primary Examiner*—Tesfaldet Bocure
(74) *Attorney, Agent, or Firm*—McAndrews, Held & Malloy, Ltd.

(57) ABSTRACT

A digital Intermediate Frequency (IF) QAM receiver 300 is provided which yields an improved SNR. The digital IF QAM receiver 300 eliminates the integration step (260, 265) and low pass filters (250, 255) of a standard digital QAM receiver 200. Instead, the digital IF QAM receiver 300 mixes the received signal with a an intermediate frequency (IF) local oscillator (LO) 325. After mixing with the IF LO 325, each channel is band pass filtered (355, 357), and then converted from analog to a digital signal (360, 362). The digital signal is then demultiplexed (365, 367) into a plurality of streams of digital pulses. The stream with the maximum average power is then selected by a select stream processor (370, 372). The selected stream is time aligned to conform to a symbol period by a stream timing alignment processor (375, 377). The aligned stream for both the I and Q channels is sent to a maximum likelihood decision mapping processor 390 which determines the respective bit code.

29 Claims, 5 Drawing Sheets

DIGITAL IF RECEIVER

BACKGROUND OF THE INVENTION

The present invention generally relates to an improved digital receiver. More particularly, the present invention relates to a digital receiver with improved decision circuitry.

Quadrature Amplitude Modulation (QAM) represents one of the most popular modulation formats used in present-day digital communication systems. QAM is a signal format obtained by separately modulating the amplitude and phase of two components of a sinusoidal carrier differing in phase by 90 degrees. The two components of a QAM are referred to as an in-phase component (usually denoted I or P) and a quadrature component (usually denoted Q).

Generally, QAM covers the classes of Binary Phase Shift Keying (BPSK), Quadrature Phase Shift Keying (QPSK) and higher order QAM modulations. QPSK is widely used, for example, in the IS-95 cellular communication standard as well as in DirectTV. Additionally, modulation formats such as Minimum Shift Keying (MSK) are popular. MSK is also widely used, for example in the GSM cellular communication standard.

One of the key performance metrics of any digital receiver is the minimum Signal-to-Noise Ratio (SNR) of the received waveform it can operate at. Waveforms with a low SNR (signal power approximately the same as noise power) are prone to a high Bit-Error-Rate (BER). Generally, in low-SNR waveforms additional error, correction may be needed.

The operation of a typical digital receiver is adversely affected by noise. Thus, much effort in the field has been directed toward minimizing noise effects on communications signals and providing an increased SNR. Although increasing the power of the transmitted signal can raise the SNR in an environment with a static noise level, a practical upper limit on the power of the transmitted signal is often present. The upper limit on signal power may be influenced by such factors as, for example, the power capacity of the components of the transmitter. Also, the Federal Communications Commission (FCC) limits the maximum power of transmitters as part of their responsibility to allocate RF resources and to protect consumer health. Furthermore, the additional size and weight requirements of higher power components or power storage may provide the upper bound for transmitted signal power. Also, in a spread spectrum communications systems such as CDMA, a high SNR may not be feasible.

Thus, an improvement in SNR at the receiver generally yields a reduction in BER. Although, as mentioned above, the SNR is dependent upon both the transmitted signal power and the noise/interference environment of the transmission, the SNR may also be improved at the receiver. For example, high quality Band-Pass Filters (BPF) may be employed at the receiver to minimize the noise component of the SNR from outside of the frequency band of communication. The resultant, filtered signal may have a higher SNR and thus yield a lower BER. When thermal noise is the dominant noise, a BPF matched to the transmitted waveform provides the theoretical, maximum SNR.

However, high quality BPFs are expensive and complex and additional techniques for improving SNR (and thus the reliability of transmitted data) are constantly being sought. Furthermore, the additional techniques are, of course, preferably compatible with existing signal receiver front ends. An improved SNR may pave the way to less weighty, less power-consumptive, less expensive, and higher bandwidth communications systems. The resulting systems provide higher reliability and may further increase economic gains. In the past, however, higher SNR has typically required unacceptable increases in system cost, complexity, or unreliability.

Thus, a need has long existed for an improved digital receiver that yields an improved SNR at the receiver.

SUMMARY OF THE INVENTION

One object of the present invention is provide a digital receiver yielding an improved Signal-to-Noise Ratio (SNR) and a corresponding improved Bit Error Rate (BER).

Another objective of the present invention is to increase the reliability and to minimize the cost, size, weight, and complexity of hardware used to provide a digital receiver with an improved SNR.

It is also an object of the present invention to provide a digital receiver compatible with existing signal receiver front ends.

One or more of the foregoing objects are met in whole or in part by the improved digital receiver of the present invention. The present invention provides a digital receiver which first mixes an input analog waveform with a Intermediate Frequency (IF) local oscillator. The IF mixed signal is then band pass filtered and converted to a digital signal. The resultant digital signal is demultiplexed into several streams of digital pulses. The stream with the greatest maximum average power is selected by a detector. The selected stream is then provided to a maximum likelihood decision mapping circuit which selects the transmitted symbol and thus the transmitted bits.

The present invention may use the peak IF values as detector inputs. By sampling at an Intermediate Frequency (IF) instead of converting the received signals to baseband and extracting maximal per period values as inputs into the maximum likelihood detector, the digital receiver yields an improved SNR.

These and other features of the present invention are discussed or apparent in the following detailed description of the preferred embodiments of the invention.

DETAILED DESCRIPTION OF THE PREFERRED EMBODIMENTS

A QAM system determines the identity of a transmitted symbol on the basis of the quadrature (Q) and in-phase (I) components of a received signal. The Q and I components may be represented as the axes of a grid of four equal quadrants, each quadrant corresponding to a different symbol. A received symbol's Q and I components are determined and the symbol is assigned a certain bit code based upon where on the grid the Q and I components project.

Figure 1:
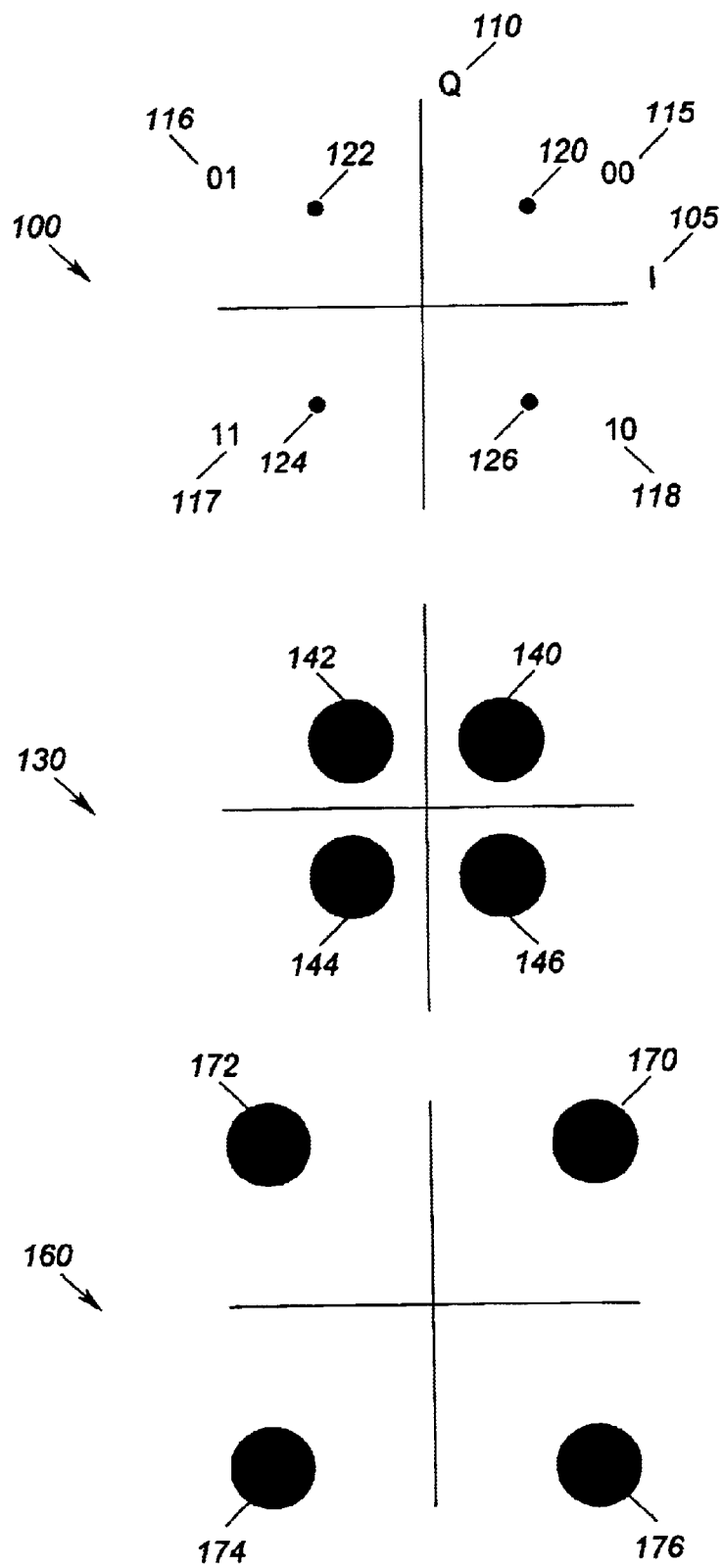
FIG. 1 shows an exemplary Quadrature Amplitude Modulation (QAM) system grid, a high noise QAM system grid, and the high noise QAM system grid with increased signal power.

FIG. 1 illustrates such a Q/I grid. FIG. 1 includes an exemplary ideal QAM system grid 100, a high noise QAM system grid 130, and the high noise QAM system grid with increased signal power 160. The ideal QAM system grid 100 includes an I axis 105 and a Q axis 110 representing the in-phase and quadrature portions of the symbol respectively. Each quadrant of the ideal QAM system grid 100 contains an ideal response point (120–126) representing the ideal QAM response. That is, in an ideal QAM system, the Q and I components of a received symbol are in one of four conditions exactly. The distance from the origin to the center of the circle represents the signal power.

However, the ideal QAM response only occurs in a noise-free condition. Due to signal degradation by thermal and other noise (as well as interference) ,the degradation introduces some variance in the received Q and I components of the symbol. Thus, the Q and I components of a symbol will place the symbol in the grid near an ideal response, but may not actually assume the value of the ideal response.

Thus, in a physically implemented system, the presence of noise causes the Q/I values of a symbol to fall within a certain radius of the point representing the ideal response. Thus, comparing the ideal QAM system grid 100 and the high noise QAM system grid 130, the grid locations where the Q/I values of the symbols fall expand from the ideal response points (120–126) of the ideal QAM system grid 100 to the larger response regions (140–146) of the high noise QAM system grid 130.

The radius of the response regions (140–146) from the ideal response points (120–126) is noise dependent. Thus, if the noise level of the QAM system continued to rise, eventually the radius of the response regions (140–146) would extend over the I or Q axis and outside the desired quadrant. The symbol points falling outside the quadrant containing the ideal response may be mistaken for different symbol values and an error in reception may occur.

Thus, to improve the performance of a communication link, either the ideal response may be moved away from the origin (increasing the distance between the ideal response and the I and Q axes) or the radius of the system response from the ideal response may be decreased. Moving the ideal response away from the origin may be accomplished by increasing the transmitted signal strength (as illustrated in the increased signal power QAM system grid 160). Decreasing the radius of the system noise response may be accomplished by decreasing the noise power. Both increasing signal strength and decreasing the received noise thus serve to reduce potential transmission errors.

Figure 2:
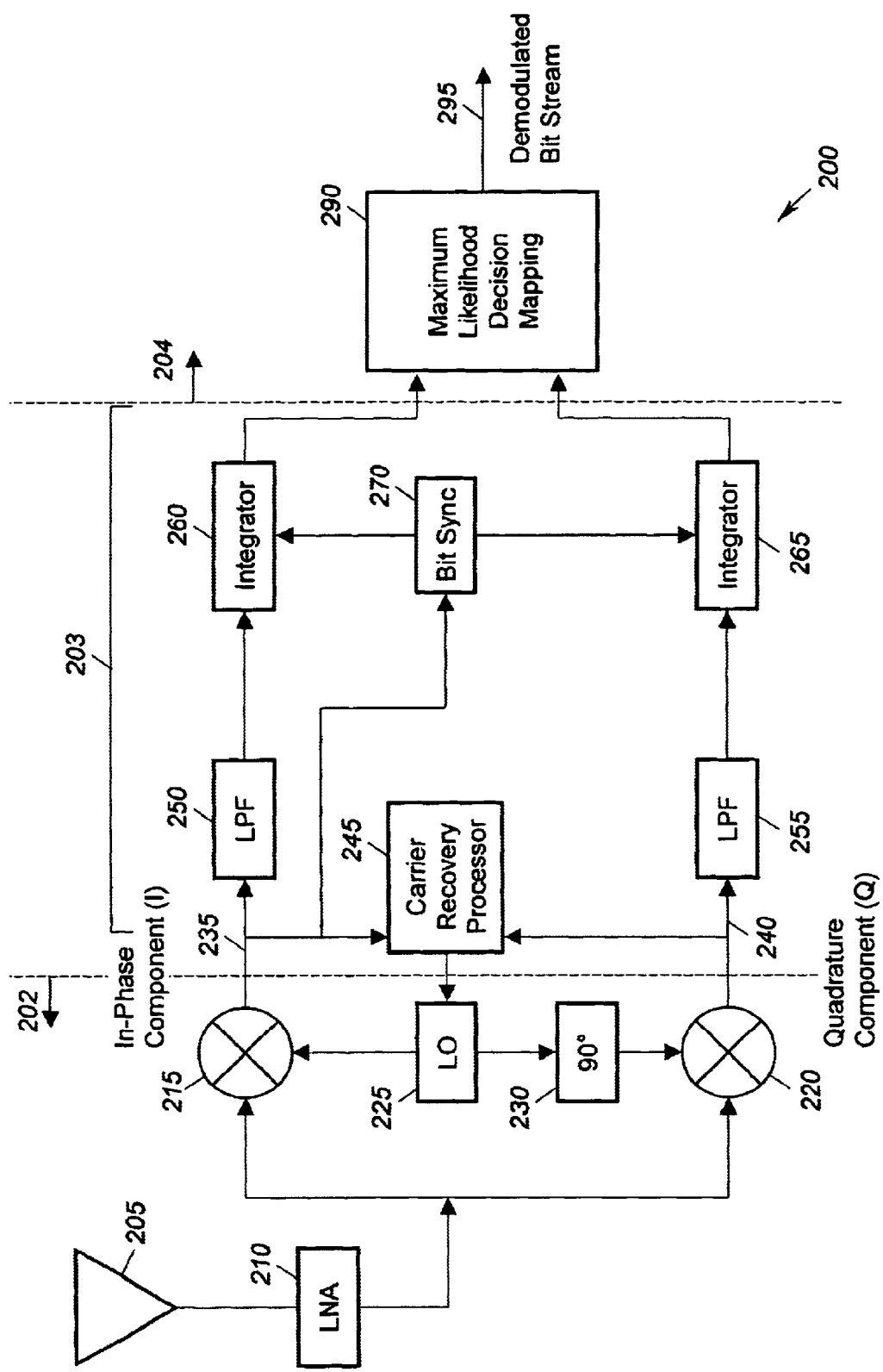
FIG. 2 shows an exemplary QAM digital receiver.

FIG. 2 shows an exemplary QAM digital receiver data extraction processor 200. In general, the QAM receiver 200 includes a front end 202, a processing component 203, and a back end 204. The front end 202 includes a receiving antenna 205, a Low Noise Amplifier (LNA) 210, an in-phase component mixer 215, a quadrature component mixer 220, a Local Oscillator (LO) 225, a 90 degrees phase shifter 230. The processing component 203 includes a carrier recovery processor 245, an in-phase (I) channel 235, a quadrature (Q) channel 240, a Low Pass Filter (LPF) 250, a second LPF 255, an I channel integrator 260, a Q channel integrator 265, and a bit synchronization circuit (Bit Sync) 270. The back end 204 includes a maximum likelihood decision mapping processor 290, and a demodulated bit stream 295.

In operation, signals are received by the receiving antenna 205 and then passed to the LNA 210. The signals then pass through the LNA 210 to the in-phase component mixer 215 and the quadrature component mixer 220. The QAM receiver 200 also includes a Local Oscillator (LO) 225 which generates the carrier signal for the QAM receiver 200. The carrier signal generated by the LO 225 is supplied to the in-phase component mixer 215. The carrier signal generated by the LO 225 is also supplied to the 90 degrees phase shifter 230 which induces a 90 degrees phase shift to the carrier signal. The resultant carrier signal with a 90 degrees phase shift is supplied to the quadrature component mixer 220.

The in-phase component mixer 215 mixes the signals from the LNA 210 with the carrier signal supplied by the LO 225. The quadrature component mixer 220 mixes the signals from the LNA with the 90 degree phase shifted carrier signal from the LO 225. The output of in-phase component mixer 215 may be generally regarded as the in-phase (I) channel 235. The output of the quadrature component mixer 220 may be generally regarded as the quadrature (Q) channel 240.

The carrier recovery processor 245 takes the I channel 235 and the Q channel 240 as inputs and produces a phase estimate of the offset between received carrier and LO phase which is sent to the LO 225. The phase estimate may be used, for example, to ensure orthogonality between the I and Q channels. The I channel 235 then passes through the Low Pass Filter (LPF) 250 to an I channel integrator 260. The Q channel 240 also is passed through a LPF 255 to the Q channel integrator 265.

A bit synchronization circuit 270 takes the I channel 235 as input and transmits a synchronization signal to both the I channel integrator 260 and the Q channel integrator 265. The synchronization signal may be used, for example, to determine the periods of integration for the signals supplied to the I and Q integrators. The I channel and Q channel integrators integrate the respective I and Q channel signals to determine the values of I and Q corresponding to the input signal.

The output of the I channel integrator 260 and the Q channel integrator 265 is sent to a maximum likelihood decision mapping processor 290. The maximum likelihood decision mapping processor 290 determines the bit values corresponding to the transmitted signal. For example, the maximum likelihood decision mapping processor 290 takes the I and Q values supplied by the respective I and Q integrators and maps the I and Q, values onto an I/Q grid such as the ideal QAM system grid 100 of FIG. 1. From the position on the grid of the I and Q values, the maximum likelihood decision mapping processor 290 determines the bit code to which the I and Q values correspond. Exemplary bit codes are shown on the ideal QAM system grid 100 of FIG. 1. For instance, I and Q values falling in the upper right quadrant of the ideal QAM system grid 100 may correspond to a "00" bit sequence 115, I and Q values falling in the upper left quadrant may correspond to a "01" bit sequence 116, I and Q values falling in the lower left quadrant may correspond to a "10" bit sequence 117, and I and Q values falling in the lower right quadrant may correspond to a "11" bit sequence 118. Each pair of I and Q values as well as the corresponding bit code may be generically referenced as a symbol.

Once the maximum likelihood decision mapping processor 290 determines which quadrant the I and Q values correspond to, the maximum likelihood decision mapping processor 290 outputs the bit code corresponding to that quadrant. Thus, over successive symbols, the output of the maximum likelihood decision mapping processor 290 forms the demodulated bit stream 295. The demodulated bit stream 295 is then available for either further processing or to be supplied to the other components of the receiver, if any.

Figure 3:
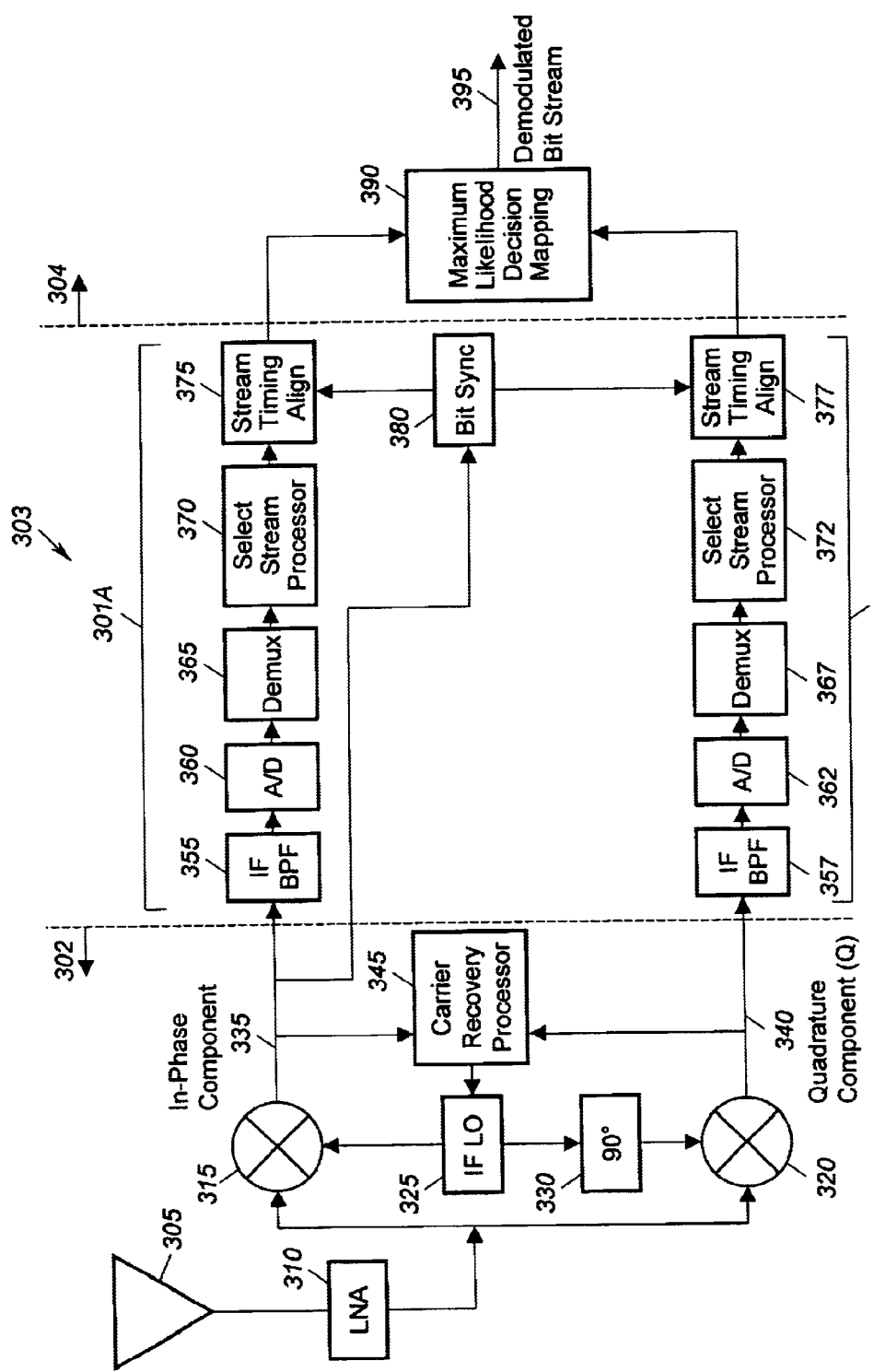
FIG. 3 illustrates a preferred embodiment of the digital Intermediate Frequency (IF) receiver of the present invention.

FIG. 3 illustrates a preferred embodiment of a digital Intermediate Frequency (IF) receiver data extraction processor 300 of the present invention. The digital IF receiver 300 includes a front end 302, a processing section 303 and a back end 304. The front end 302 includes a receiving antenna 305, a Low Noise Amplifier (LNA) 310, an in-phase component mixer 315, a quadrature component mixer 320, a Intermediate Frequency (IF) Local Oscillator (LO) 325, a 90 degrees phase shifter 330, an in-phase (I) channel 335, a quadrature (Q)channel 340, and a carrier recovery processor 345.

The processing section 303 includes an I channel section 301A, a Q channel section 301B, and a bit synchronization circuit (Bit Sync) 380. The I channel section 301A includes an I channel IF Band-Pass Filter (BPF) 355, an I channel Analog-to-Digital Converter (A/D) 360, an I channel demultiplexor (Demux) 365, an I channel Select Stream Processor (SSP) 370, and an I channel Stream Timing Alignment Processor 375. The Q channel section 301B includes a Q channel IF BPF 357, a Q channel A/D 362, a Q channel Demux 367, a Q channel SSP 372, and a Q channel Stream Timing Alignment Processor 377.

The back end 304 includes a maximum likelihood decision mapping processor 390, and a demodulated bit stream output 395.

In operation, signals are received by the receiving antenna 305 and then are passed to the LNA 310. The received signals are amplified by the LNA 310 and then are passed to the in-phase component mixer 315 and the quadature component mixer 320. The IF LO 325 generates an intermediate frequency signal (at the desired IF) which is supplied directly to the in-phase component mixer 315. Additionally, the IF signal generated by the IF LO 325 is also supplied to the 90 degrees phase shifter 330 which induces a 90 degrees phase shift to the IF signal. The resultant shifted IF signal is supplied to the quadrature component mixer 320.

The in-phase component mixer 315 mixes the signals from the LNA 310 with the IF signal supplied by the IF LO 325. The quadrature component mixer 320 mixes the signals from the LNA with the 90 degree phase shifted IF signal from the IF LO 325. The output of in-phase component mixer 315 may be generally regarded as the in-phase (I) channel 335. The output of the quadrature component mixer 320 may be generally regarded as the quadrature (Q) channel 340. The carrier recovery processor 345 takes the I channel 335 and the Q channel 340 as inputs and produces a phase estimate which is sent to the IF LO 325 to assure synchronization of the IF LO to the received signal. Again, the phase estimate may be used, for example, to ensure orthogonality between the I an Q channel.

The IF LO 325 oscillates at a frequency less than the received signals, but greater than the bandwidth of the baseband signal. The IF frequency generated by the IF LO 325 is typically chosen for convenience in transferring the received signal from the front end 302 to later processing steps. For example, the IF may typically range from between one half and one tenth of the carrier frequency of the received signal, and is greater than or equal to the baseband signal bandwidth. Preferably, the frequency of the IF LO 325 is at least 4 times the symbol rate, the theoretical minimum sampling rate for bandpass signals. That is, the IF would cycle four times during a single symbol transmission.

The I channel 335 is then passed to the I channel BPF 355 where the signal is filtered. The output of the I channel BPF 355 then proceeds to the I channel A/D 360 where the analog signal is sampled and converted into a series of digital pulses. The output of the I channel A/D is then passed to the I channel Demux 365 where the signal is demultiplexed into at least two signal streams (as will be further explained below). The output of the I channel Demux 365 is then sent to the I channel SSP 370 where the I channel SSP 370 selects one of the demultiplexed streams (as described in more detail below). The stream selected by the I channel SSP 370 is then transmitted to the I channel stream timing alignment processor 375.

The I channel stream timing alignment processor 375 also receives a bit synchronization signal from the bit sync 380. The bit sync 380 takes the I channel 335 as input and transmits a synchronization signal to both the I channel stream timing alignment processor 375 and the Q channel stream timing aligment processor 377. The synchronization signal may be used, for example, to determine the edges of the successive symbol periods.

The I channel stream timing alignment processor 375 uses the signal from the bit sync 380 to define the edges of successive sampling periods. The output of the I channel stream timing alignment processor 375 is then passed to the maximum likelihood decision mapping processor 390.

Similarly, the Q channel 340 is passed in sequence through the Q channel BPF 357, the Q channel A/D 362, the Q channel Demux 367, the Q channel SSP 372 and the Q channel stream timing alignment processor 377. As with the I channel, the output of the Q channel stream timing alignment processor 377 is passed to the maximum likelihood decision mapping processor 390.

The maximum likelihood decision mapping processor 390 takes the I and Q values supplied by the respective I and Q stream timing alignment processors and maps the I and Q values onto an I/Q grid such as the ideal QAM system grid 100 of FIG. 1. From the position on the grid of the I and Q values, the maximum likelihood decision mapping processor 390 determines the symbol and thus the bit sequence to which the I and Q values correspond. The maximum likelihood decision mapping processor 390 outputs these bit codes as a demodulated bit stream 395. The demodulated bit stream 395 is then available for either further processing or to be supplied to the other components of the receiver, if any.

The I channel A/D 360 and the Q channel A/D 362 preferably sample at a rate N of at least 4 samples per IF cycle ($N \geq 4$). As an example, 10 samples per IF cycle may be used. Thus, the total number of samples per second is N times the IF frequency. Preferably, each sample is expressed as a 10 bit vector. Thus, a multi-bit sample of an A/D output is represented preferably as a 10 bit vector. Also, preferably, the number of samples per IF cycle may be set to be a multiple of two for ease of demultiplexing.

The I channel Demux 365 and the Q channel Demux 367 preferably generate several individual streams for transmission to the respective SSP. For example, again using N as the sample rate, the Demux may generate two streams of digital pulses, each stream including N/2 digital samples of the analog waveform, the samples separated in time by 1/(2*IF). Alternatively, for example, the Demux may generate four or more streams.

The I channel SSP 370 and the Q channel SSP 372 select the stream with the maximum average power and supply the stream to their respective stream timing alignment circuit. The average power of a stream may be expressed as:

$$V_j = \frac{\sum_{i=1}^{Imax} |v_j(i)|^2}{Imax}$$

where the instantaneous voltage of the ith digital pulse of stream j is $v_j(i)$ and the stream contains Imax digital pulses. The summation starts at i=1 with the start of the symbol and ends at Imax at the stream's last sample for the end of a symbol. Symbol start and stop times may be provided by the Bit Sync 380. The number of pulses per stream, Imax, may vary depending upon the number of streams into which the signal is demultiplexed. Thus, $V_j$, the average power of a stream j, is found by summing the square of the instantaneous voltage of each of the Imax digital pulses of stream j and then dividing by the number of pulses, Imax. The average power is preferably recomputed for each stream during each symbol period.

The I channel and Q channel stream timing alignment processors receive their respective streams with the maximum average power from their respective SSPs. Preferably, the stream timing alignment processor uses the synchronization information from the Bit Sync 380 to determine the edges of the successive symbol periods. The maximum power streams are then sent to the maximum likelihood decision mapping processor 390.

As shown in FIG. 2, the past QAM receiver 200 relies on an integration to generate the Q and I values to be sent to the maximum likelihood decision processor. In the past QAM receiver 200, the Q and I channels are integrated over an entire symbol time T with the Bit Sync 270 providing the edges of successive periods for integration.

In contrast, the present digital IF receiver 300 converts directly to digital by generating many ten-bit samples over a single symbol period. The ten-bit samples are separated into a number of streams. The stream from beginning to end of a symbol with the maximum average power is chosen and passed to the maximum likelihood decision mapping processor 390.

The digital IF receiver 300 yields an improved signal level compared to the past QAM receiver 200. This improvement in performance may be attributed to several factors. One factor is that the digital IF receiver 300 converts directly to digital as described above. Another factor is the elimination of the LPFs 250 and 255 in favor of IF BPFs 355 and 357. The LPFs 250 and 255 may yield greater noise and may truncate pert of the signal energy thus reducing the Signal-to-Noise Ratio (SNR).

By eliminating the integration step and the LPFs in favor of digitizing, using IF BPFs, and selecting the stream with the maximum average power, the digital IF receiver improves the overall received SNR compared to previous integrators. The improvement in SNR may also be due, in part, to the fact that the standard integrator integrates both the product of the peak and all non-peak signals instead of only providing near-peak estimates. That is, whereas the past integrators averaged over the full sine wave product to form the input to the maximum likelihood detector, the proposed method only focuses on the instantaneous peak values of the signal during a bit time T.

In a constant noise environment, the instantaneous peak values of a signal, because the signal strength is greatest, have the highest SNR while values away from the peak have lesser SNRs. Integration over all instantaneous values, because of the averaging effect of the integration, produces an overall SNR much less than the peak SNR. The present digital IF receiver 300 uses the peak signals without added noise from non-peak signals and thus produces a superior SNR.

Thus, a higher number of samples per period increases the probability that any one sample will fall directly on the peak of the waveform and thus provide the most optimal SNR. A higher number of streams also allows the select stream processor to choose among many alternate streams to select the stream with the highest SNR.

Figure 4:
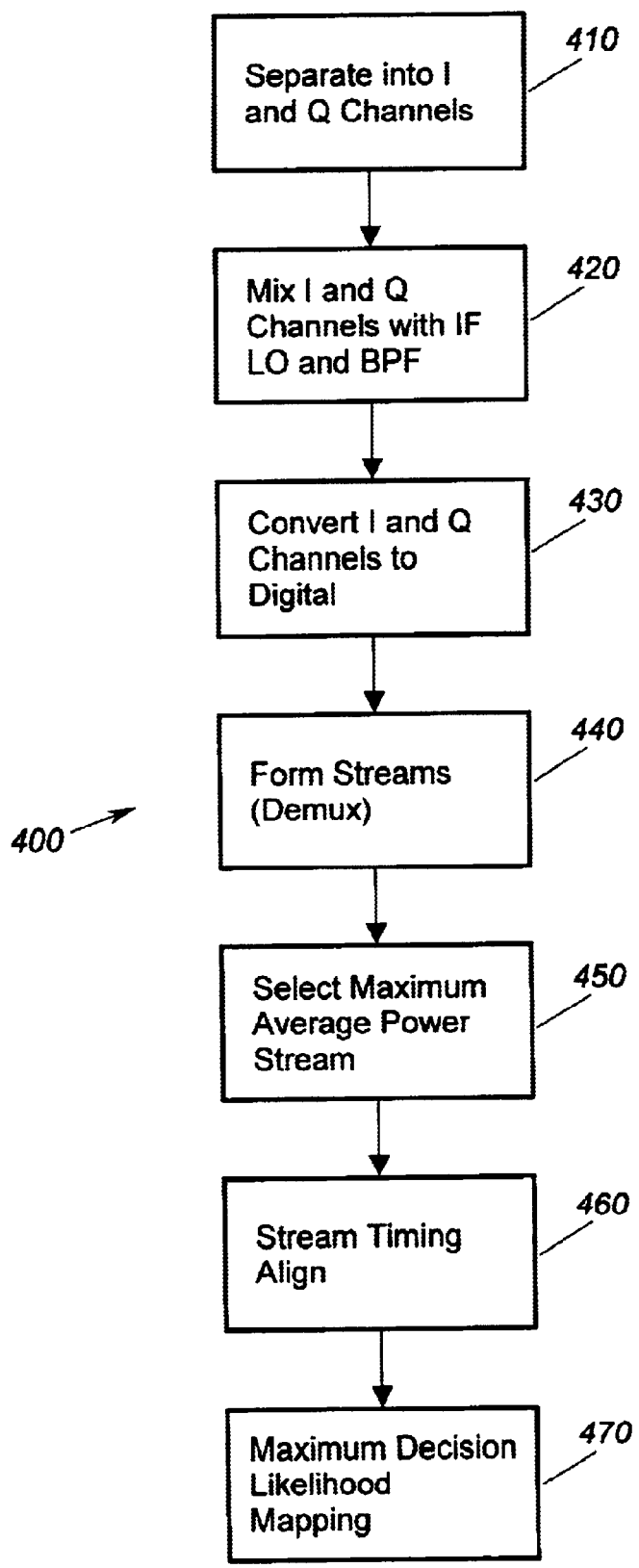
FIG. 4 illustrates a flow chart of a preferred embodiment of the present invention.

FIG. 4 illustrates a flowchart 400 of the preferred embodiment of the present invention. First, the received signal is separated into I and Q channels at step 410. Then both the I and Q channels are mixed (at step 420) with the IF local oscillator and then Band Pass Filtered (BPF). Next, step 430 converts both the I and Q channels from analog to digital. Subsequently the digital receiver forms, at step 440, a plurality of digital streams. The maximum average power stream is selected at step 450. Next, the timing of the maximum power stream is aligned (step 460) to reflect the symbol period. Finally, the maximum power stream is mapped onto the maximum decision likelihood mapping grid (step 470).

Additionally, the preferred embodiment of the digital IF receiver of the present invention also combats fast fading. Fading may be described as fluctuations in channel performance due to such factors as multipath propagation effects and interference. Because the digital IF receiver samples at a high rate (preferably at least 4 samples per IF cycle), the digital IF receiver may adjust more quickly to fading conditions. Also, with the high sampling rate of the digital IF receiver, conventional techniques such as echo cancellation can be utilized. This eliminates redundancy between an integrator and a high-rate sampler found in some systems.

Additionally, the preferred embodiment of the digital IF receiver of the present invention may be implemented as a single integrated circuit and may be connected to existing front ends. Except for the substitution of the IF LO 325 for the LO 335, no external changes to an existing front end are necessary. That is, the preferred embodiment of the digtal IF receiver takes the I channel 335 and the Q channel 340 as by previous receivers, except at the IF instead of baseband. The preferred embodiment of the digital IF receiver also supplies the same type of output to the same type of maximum likelihood decision mapping processor 390 as does the receiver 200 of FIG. 2. The preferred embodiment of the digital IF receiver thus may provide an improved SNR with a single integrated circuit replacement in conventional systems.

Figure 5:
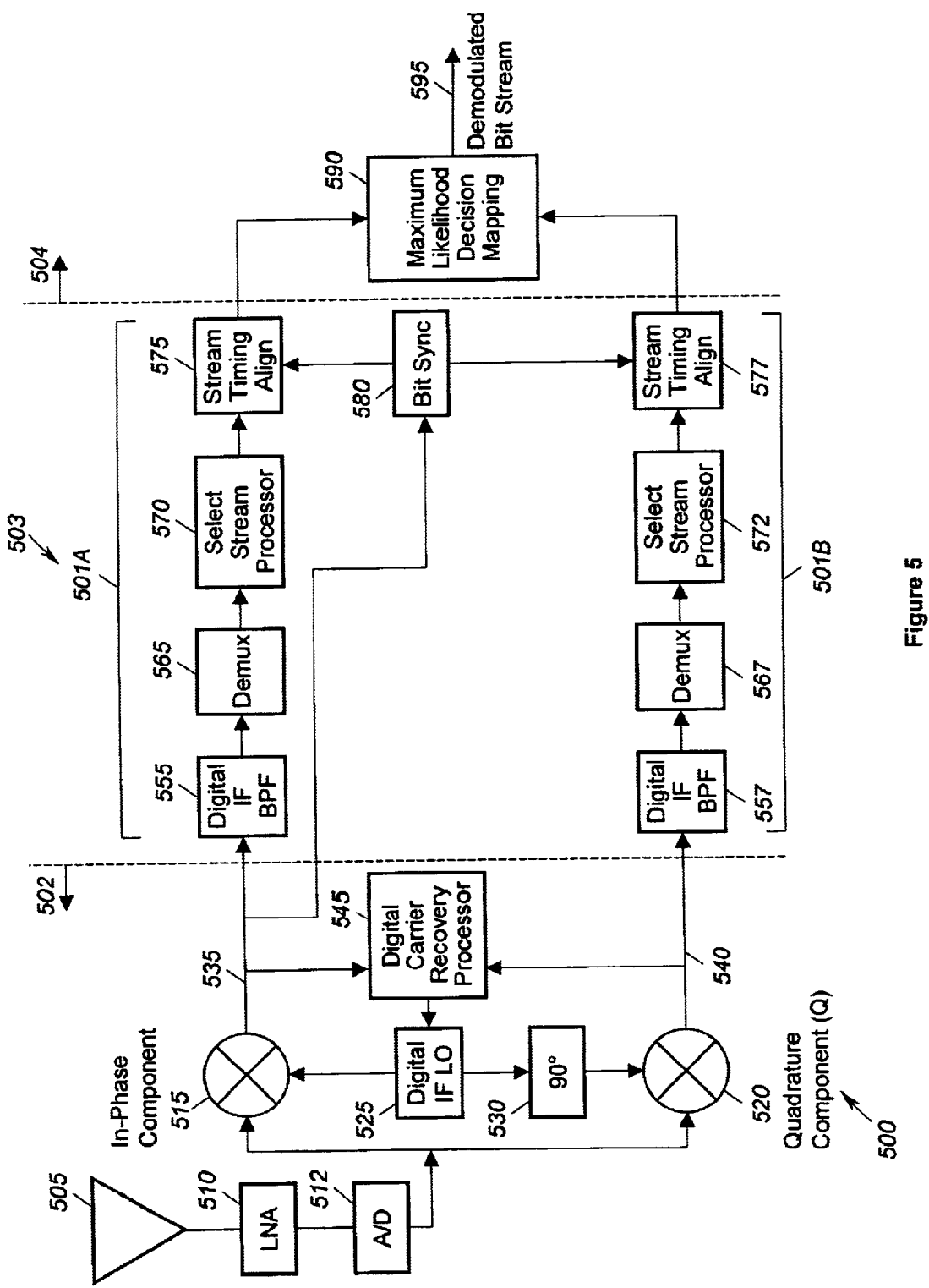
FIG. 5 illustrates an alternative embodiment of a digital IF receiver 500 of the present invention.

FIG. 5 illustrates an alternative embodiment of a digital IF receiver data extraction processor 500 of the present invention. The alternative digital IF receiver 500 includes a front end 502, a processing section 503 and a back end 504. The front end 502 includes a receiving antenna 505, a Low Noise Amplifier (LNA) 510, a high speed Analog-to-Digital Converter (A/D) 512, a digital in-phase component mixer 515, a digital quadrature component mixer 520, a Digital Intermediate Frequency (IF) Local Oscillator (LO) 525, a 90 degrees phase shifter 330, an in-phase (I) channel 535, a quadrature (Q) channel 540, and a digital carrier recovery processor 545.

The processing section 503 includes an I channel section 501A, a Q channel section 501B, and a bit synchronization circuit (Bit Sync) 580. The I channel section 501A includes a digital I channel IF Band-Pass Filter (BPF) 555, an I channel demultiplexor (Demux) 565, an I channel Select Stream Processor (SSP) 570, and an I channel Stream Timing Alignment Processor 575. The Q channel section 501B includes a Q channel digital IF BPF 557, a Q channel Demux 567, a Q channel SSP 572, and a Q channel Stream Timing Alignment Processor 577.

The back end 504 includes a maximum likelihood decision mapping processor 590, and a demodulated bit stream output 595.

During operation of the alternative digital IF receiver 500 signals are received by the receiving antenna 505 and then are passed to the LNA 510. The received signals are amplified by the LNA 510. The amplified signals are then passed to the high speed A/D 512 which samples the analog signal and converts the analog signal into a series of digital pulses. The digitized signals are then passed to the digital in-phase component mixer 515 and the digital quadrature component mixer 520. The digital IF LO 525 generates a digital intermediate frequency signal (at the desired IF) which is supplied directly to the digital in-phase component mixer 515. Additionally, the IF signal generated by the digital IF LO 525 is also supplied to the 90 degrees phase shifter 530 which induces a 90 degrees phase shift to the IF signal. The resultant shifted IF signal is supplied to the digital quadrature component mixer 520.

The digital in-phase component mixer 515 mixes the signals from the high speed A/D 512 with the digital IF signal supplied by the digital IF LO 525 to form the I channel 535. The digital quadrature component mixer 520 mixes the signals from the high speed A/D 512 with the 90 degree phase shifted digital IF signal from the digital IF LO 525 to form the Q channel 540. The digital carrier recovery processor 545 takes the I channel 535 and the Q channel 540 as inputs and produces a phase estimate which is sent to the digital IF LO 525 to assure synchronization of the digital IF LO to the received signal.

The I channel 335 is then passed to the I channel digital BPF 555 where the signal is filtered. The output of the I channel digital BPF 555 then proceeds to the I channel Demux 365 where the signal is demultiplexed. Similarly, the Q channel 540 is passed to the Q channel digital BPF 557 and then to the Q channel Demux 567. The operation of the alternative digital IF receiver 500 then proceeds generally similarly to the digital receiver 300 of FIG. 3.

Thus, the operation of the alternative digital IF receiver 500 is generally similar to the operation of the digital IF receiver 300 of FIG. 3 except the I channel A/D 360 and the Q channel A/D 362 are eliminated and a single, upstream high speed A/D 512 provides the analog to digital conversion. Additionally, because the single A/D takes place before the received signal is mixed into its component channels, the signal supplied by the IF LO 525 is digital and the in-phase component mixer 515 and the quadrature component mixer 520 are also digital. Additionally, the digital carrier recovery processor 545 provides carrier recovery for the digitized channels. Also, the I channel IF BPF 555 and Q channel BPF 557 are digital filters.

In FIG. 3, the I and Q channels 335, 340 are digitized before being passed to the I and Q channel demuxes 565, 567. In FIG. 5, the I and Q channels 535, 540 have already been digitized. The digital signal supplied to the Demuxes in both cases is generally similar as is the remaining structure of the receiver.

The elimination of the I and Q channel A/D's 360, 362 of FIG. 3 in favor of a single upstream high speed A/D 512 of FIG. 5 may provide several benefits. For example, the alternative digital IF receiver 500 may be smaller, lighter, and less costly to manufacture. Additionally, the alternative digital IF receiver 500 has the advantage of being all digital which may yield higher speed and greater error-control, for example.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A digital receiver data extraction processor comprising:

an I channel analog-to-digital converter for converting an I channel input into an I channel digitized output;

a Q channel analog-to-digital converter for converting a Q channel input into a Q channel digitized output;

an I channel demultiplexor responsive to said I channel digitized output from said I channel analog-to-digital converter for generating a plurality of I channel streams;

a Q channel demultiplexor responsive to said I channel digitized output from said I channel analog-to-digital converter for generating a plurality of Q channel streams;

an I channel select stream processor producing an I stream output signal;

a Q channel select stream processor producing a Q stream output signal; and a decision mapping processor for mapping said I stream output signal and said Q stream output signal onto a transmitted symbol.

2. The digital receiver data extraction processor of claim 1 further comprising:

an Intermediate Frequency (IF) local oscillator generating an IF signal;

an antenna and low noise amplifier receiving a transmitted signal;

an I channel IF band-pass filter coupled to said I channel analog-to-digital converter;

a Q channel IF band-pass filter coupled to said Q channel analog-to-digital converter;

an in-phase component mixer mixing said IF signal and said transmitted signal and transmitting the resultant mixed signal to an I channel IF band-pass filter; and a quadrature component mixer mixing said IF signal phase shifted by 90 degrees and said transmitted signal and transmitting the resultant mixed signal to an Q channel IF band-pass filter.

3. The digital receiver data extraction processor of claim 1 further comprising:

an I channel stream timing alignment processor; and a Q channel stream timing alignment processor.

4. The digital receiver data extraction processor of claim 2 wherein the IF local oscillator oscillates at a frequency of at least four times a predetermined symbol rate.

5. The digital receiver data extraction processor of claim 1 wherein the I channel and Q channel analog-to-digital converters sample at least four times the frequency of said IF local oscillator.

6. The digital receiver data extraction processor of claim 1 wherein the I channel and Q channel demultiplexors each form at least two streams of digital pulses.

7. The digital receiver data extraction processor of claim 1 wherein the I channel select stream processor comprises circuitry to select as said I stream output signal a first maximum average power stream from the beginning of a symbol to the end of a symbol from said plurality of I channel streams generated by said I channel demultiplexor; and the Q channel select stream processor comprises circuitry to select as said Q stream output signal a second maximum average power stream from the beginning of a symbol to the end of a symbol from said plurality of Q channel streams generated by said Q channel demultiplexor.

8. The digital receiver data extraction processor of claim 3 wherein the I channel and Q channel stream timing alignment processors align the stream timing relative to bit transition references from a bit sync output.

9. A method for processing a received signal in a digital receiver, the method comprising:

converting an I channel signal from analog to digital to produce a digital I signal;

converting a Q channel signal from analog to digital to produce a digital Q signal;

demultiplexing said digital I signal into a plurality of I channel streams;

demultiplexing said digital Q signal into a plurality of Q channel streams;

selecting one of said I channel streams to produce a selected I stream;

selecting one of said Q channel streams to produce a selected Q stream; and outputting a symbol responsive to said selected I stream and said selected Q stream.

10. The method of claim 9, wherein said outputting step further comprises outputting said symbol based on a maximum likelihood decision.

11. The method of claim 9 further comprising:

mixing the I channel signal with a local oscillator signal at an Intermediate Frequency (IF) and band pass filtering the resultant I channel signal; and mixing the Q channel signal with a local oscillator signal at an Intermediate Frequency (IF) and band pass filtering the resultant Q channel signal.

12. The method of claim 9 further comprising:

aligning selected I channel stream timing; and aligning selected Q channel stream timing.

13. The method of claim 11 wherein said step of mixing each of the I channel and the Q channel with a local oscillator at an Intermediate Frequency (IF) comprises the step of mixing each of the I channel and the Q channel with a local oscillator at an Intermediate Frequency (IF), where said IF local oscillator oscillates at a frequency of at least four times the symbol rate.

14. The method of claim 9 wherein said steps of converting the I channel signal and the Q channel signal from analog to digital comprises the steps of converting the I channel signal and the Q channel signal from analog to digital where the sampling rate is at least four times the frequency of said IF local oscillator.

15. The method of claim 9 wherein said steps of demultiplexing the digital I signal and the digital Q signal into a plurality of streams comprises the steps of demultiplexing the digital I signal and the digital Q signal into at least two streams of digital pulses each.

16. The method of claim 9 wherein said step of selecting one of the demultiplexed streams for each of the I and Q channels comprises the step of selecting a demultiplexed stream from the beginning of a symbol to the end of a symbol for each of the I and Q channels having a maximum average power.

17. The method of claim 12 wherein said step of aligning the timing of the selected stream comprises the step of aligning the timing of the selected stream relative to bit transition references from a bit sync output.

18. A digital receiver comprising:

an antenna and low noise amplifier;

an Intermediate Frequency (IF) local oscillator having a carrier recovery processor and separating an incident signal into I and Q channels;

an I channel and a Q channel IF band pass filter;

an I channel and a Q channel analog-to-digital converter converting each I and Q channel into a series of digital pulses;

an I channel and a Q channel demultiplexor demultiplexing said series of digital pulses into a plurality of streams;

an I channel and a Q channel select stream processor selecting a single I channel stream and a single Q channel stream from among the plurality of multiplexed streams;

an I channel and a Q channel stream timing alignment processor for aligning the stream timing of said single I channel stream and said single Q channel stream; and a maximum likelihood decision mapping processor receiving said single I channel stream and said single Q channel stream.

19. The digital receiver of claim 18 wherein the IF local oscillator oscillates at a frequency of at least four times the symbol rate.

20. The digital receiver of claim 18 wherein the I channel and Q channel analog-to-digital converters sample at at least four times the frequency of said IF local oscillator.

21. The digital receiver of claim 18 wherein the I channel and Q channel demultiplexors form at least four streams of digital pulses.

22. The digital receiver of claim 18 wherein the I channel and Q channel select stream processors select the maximum average power stream from the start of a symbol to the end of a symbol from the streams supplied to processors by their respective demultiplexors.

23. The digital receiver of claim 18 wherein the I channel and Q channel stream timing alignment processors align the stream timing relative to bit transition references from a bit sync output.

24. A digital receiver comprising:

an antenna and low noise amplifier for receiving and amplifying a received analog signal;

a high speed analog-to digital converter for converting said received analog signal into a received series of digital pulses;

a digital Intermediate Frequency (IF) local oscillator having a digital carrier recovery processor and separating said received series of digital pulses into I and Q channels;

an I channel and a Q channel digital IF band pass filter;

an I channel and a Q channel demultiplexor demultiplexing said series of digital pulses into a plurality of streams;

an I channel and a Q channel select stream processor selecting a single I channel stream and a single Q channel stream from among the plurality of multiplexed streams;

an I channel and a Q channel stream timing alignment processor for aligning the stream timing of said single I channel stream and said single Q channel stream; and a maximum likelihood decision mapping processor receiving said single I channel stream and said single Q channel stream.

25. The digital receiver of claim 24 wherein the digital IF local oscillator produces a frequency signal equivalent to at least four times the symbol rate.

26. The digital receiver of claim 24 wherein the high speed analog-to digital converter samples at at least four times the frequency of said digital IF local oscillator.

27. The digital receiver of claim 24 wherein the I channel and Q channel demultiplexors form at least four streams of digital pulses.

28. The digital receiver of claim 24 wherein the I channel and Q channel select stream processors select the maximum average power stream from the start of a symbol to the end of a symbol from the streams supplied to processors by their respective demultiplexors.

29. The digital receiver of claim 24 wherein the I channel and Q channel stream timing alignment processors align the stream timing relative to bit transition references from a bit sync output.

* * * * *